United States Patent
Jeong et al.

(10) Patent No.: US 10,635,488 B2
(45) Date of Patent: Apr. 28, 2020

(54) SYSTEM, METHOD AND COMPUTER PROGRAM FOR DATA SCRAPING USING SCRIPT ENGINE

(71) Applicant: COOCON CO., LTD., Seoul (KR)

(72) Inventors: Jae Won Jeong, Gyeonggi-do (JP); Cheong Seok Back, Seoul (KR)

(73) Assignee: Coocon Co., Ltd., Seoul (KR)

( * ) Notice: Subject to any disclaimer, the term of this patent is extended or adjusted under 35 U.S.C. 154(b) by 0 days.

(21) Appl. No.: 16/112,528

(22) Filed: Aug. 24, 2018

(65) Prior Publication Data

US 2019/0332424 A1  Oct. 31, 2019

(30) Foreign Application Priority Data

Apr. 25, 2018  (KR) .................. 10-2018-0047729

(51) Int. Cl.
| | |
|---|---|
| *G06F 9/46* | (2006.01) |
| *G06F 9/48* | (2006.01) |
| *G06F 8/65* | (2018.01) |
| *H04L 9/32* | (2006.01) |
| *H04L 29/06* | (2006.01) |

(52) U.S. Cl.
CPC .............. *G06F 9/4881* (2013.01); *G06F 8/65* (2013.01); *H04L 9/3268* (2013.01); *H04L 63/0861* (2013.01)

(58) Field of Classification Search
CPC .................................................. G06F 9/4881
USPC ........................................................ 718/102
See application file for complete search history.

(56) References Cited

U.S. PATENT DOCUMENTS

| | | | | |
|---|---|---|---|---|
| 9,298,806 | B1 * | 3/2016 | Vessenes | G06Q 20/065 |
| 10,284,451 | B2 * | 5/2019 | Shiihara | H04L 67/42 |
| 2003/0023755 | A1 * | 1/2003 | Harris | H04L 67/2823 |
| | | | | 709/246 |
| 2003/0204460 | A1 | 10/2003 | Robinson et al. | |
| 2006/0095377 | A1 * | 5/2006 | Young | H04L 63/10 |
| | | | | 705/50 |

(Continued)

FOREIGN PATENT DOCUMENTS

| | | |
|---|---|---|
| JP | 2000082066 A | 3/2000 |
| JP | 2002208926 A | 7/2002 |

(Continued)

*Primary Examiner* — Mehran Kamran
(74) *Attorney, Agent, or Firm* — Faegre Drinker Biddle & Reath LLP (57) ABSTRACT

A data scraping system includes: a management module having a service program that calls inquiry or execution requiring scraping to receive user information for scraping and allocate user information and a task using an internal scheduling algorithm; and a scraping module connected to a plurality of different institutions, allowing communication, based on the user information and the task allocated by the management module, to scrape data corresponding to the called inquiry or execution from the plurality of institutions. The scraping module includes a meta database to designate a data item to be scraped, and is configured to extract data to scrape based on the meta database from a data set provided by the institution. According to the data scraping system, it is possible to enable data scraping in various platforms such as mobile computing devices, and collect multiple scraping information in one device without constraints of a security module.

13 Claims, 7 Drawing Sheets

(56) References Cited

U.S. PATENT DOCUMENTS

| | | | |
|---|---|---|---|
| 2007/0067238 A1* | 3/2007 | Rabson | G06Q 20/102 705/40 |
| 2007/0250711 A1* | 10/2007 | Storey | H04W 4/18 713/168 |
| 2007/0276851 A1* | 11/2007 | Friedlander | G06F 16/283 |
| 2009/0063438 A1* | 3/2009 | Awad | G06Q 10/10 |
| 2009/0288169 A1* | 11/2009 | Petta | G06F 21/552 726/26 |
| 2011/0282678 A1* | 11/2011 | Chapman | G07F 7/1025 705/1.1 |
| 2012/0013805 A1* | 1/2012 | Mihara | H04N 21/45457 348/569 |
| 2012/0173524 A1* | 7/2012 | Connor | G06Q 10/10 707/736 |
| 2012/0310914 A1* | 12/2012 | Khan | G06F 16/951 707/710 |
| 2012/0317472 A1* | 12/2012 | Chernysh | G06F 17/2229 715/234 |
| 2013/0311875 A1* | 11/2013 | Pappas | G06F 17/2247 715/234 |
| 2014/0149842 A1* | 5/2014 | Murthy | G06F 17/2247 715/234 |
| 2014/0281477 A1* | 9/2014 | Nayshtut | H04L 9/0825 713/150 |
| 2014/0351091 A1* | 11/2014 | He | G06Q 30/0625 705/26.62 |
| 2016/0154967 A1* | 6/2016 | Lee | G06F 21/606 713/189 |
| 2016/0232194 A1* | 8/2016 | Abraham | G06F 16/2365 |
| 2017/0142191 A1* | 5/2017 | Caldwell | H04L 63/083 |
| 2017/0220681 A1* | 8/2017 | Daas | G06F 16/951 |
| 2017/0255793 A1* | 9/2017 | Caldwell | G06Q 30/06 |
| 2018/0115559 A1* | 4/2018 | Schutz | G06Q 40/025 |
| 2018/0150562 A1* | 5/2018 | Gundimeda | G06F 17/2705 |
| 2018/0218446 A1* | 8/2018 | Ries | H04L 63/0884 |
| 2018/0248702 A1* | 8/2018 | Wu | G06F 21/51 |
| 2019/0108585 A1* | 4/2019 | Caldwell | G06Q 40/025 |
| 2019/0190702 A1* | 6/2019 | Isshiki | H04L 9/088 |

FOREIGN PATENT DOCUMENTS

| | | |
|---|---|---|
| JP | 2017120607 A | 7/2017 |
| KR | 100494975 B1 | 6/2005 |
| KR | 101125083 B1 | 3/2012 |
| KR | 101213360 B | 12/2012 |
| KR | 20140028789 A | 3/2014 |
| KR | 101569984 B1 | 11/2015 |
| WO | 2014098237 A1 | 6/2014 |

* cited by examiner

SYSTEM, METHOD AND COMPUTER PROGRAM FOR DATA SCRAPING USING SCRIPT ENGINE

CROSS-REFERENCE TO RELATED APPLICATIONS

This application claims priority under 35 U.S.C. § 119 to Korean Patent Application No. 10-2018-0047729, filed on Apr. 25, 2018, in the Korean Intellectual Property Office, the disclosure of which is incorporated herein by reference in its entirety.

TECHNICAL FIELD

Embodiments relate to a system, method and computer program for data scraping, and more particularly, to developing a scraping module with a script engine in which environment information of scraping is stored, to enable processing of scraping from various operating systems in one scraping module.

BACKGROUND

In general, screen scraping is implemented by a software that extracts only necessary data from data displayed on the screen, and is technology that automatically accesses a system, displays data on the screen, and extracts and fetches only necessary data. Because it extracts information from a web site and stores it in another site or database, it is also called web scraping. Because of storing data, it is possible to see at any time when needed, and the stored data may be processed for the purpose of use as comparison analysis data. In particular, it is an essential program for Internet banking and is being actively run by each financial institution, and can be used at any place where users can obtain information by clicking, for example, reward programs such as mileages of hotels, airline companies, rent cars and oil stations, e-mail integration check, news, chat, weather, etc.

The screen scraping technology has been widespread in the United States since the late 1990s, and in Korea, since FINGER INC. established in 2000 first developed this technology and started providing financial services, it is being widely used, primarily, by financial institutions. Currently, a typical example is personal finance management software (PFMS) that enables integration and management of many accounts of financial institutions possessed by a person. There is no need to individually visit each website, providing time and cost savings advantage, but there is concern about invasion of privacy, and a disadvantage is programming modification required every time sites are updated.

The screen scraping technology is largely classified into client side and server side, and is highly useful in account integration services, or personal financial management or business financial management programs, but client side screen scraping technology overwhelmingly predominates over server side due to the domestic security policy requiring the end-to-end policy enforcement.

Figure 1:
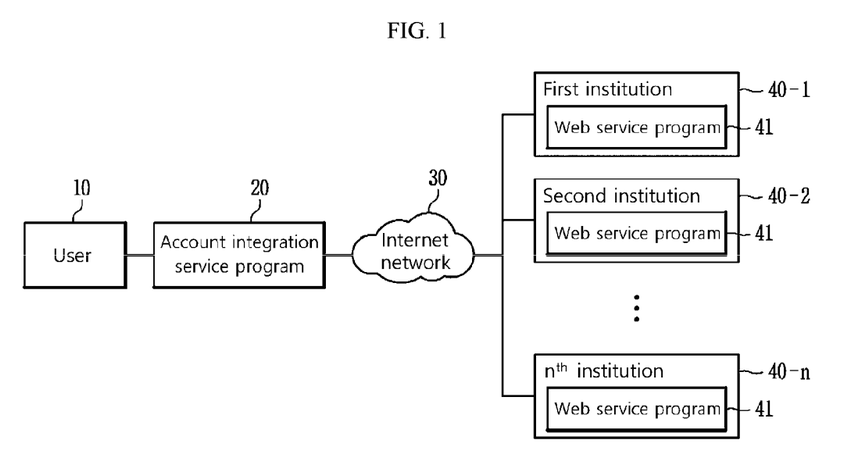
FIG. 1 is an architecture diagram of a conventional account integration service system using screen scraping.

FIG. 1 is an architecture diagram of a conventional account integration service system using client side screen scraping.

As shown in FIG. 1, when a user 10 accesses web service programs 41 registered in first to $n^{th}$ institutions 40-1 to 40-n through an account integration service program 20 via an Internet network 30, the conventional account integration service system performs a service according to communication security policies of the first to $n^{th}$ institutions 40-1 to 40-n. In this instance, the screen scraping is performed using the account integration service program 20.

As shown in FIG. 1, upon screen scraping of a finance related web service, the conventional account integration service system using client side screen scraping is configured to execute a plurality of screen scraping tasks in a sequential order and receive the results due to service stability or technical limitations. For example, upon scraping to see transaction details of many bank accounts, there is a problem with serious performance degradation.

To solve this problem, technology for parallel screen scraping by a plurality of scraping machines has been developed. However, conventionally, for scraping machines to work in different operating systems, it is necessary to separately develop scraping modules suitable for each operating system to conform to the security policies required by the financial institutions. For example, there is a need to develop each separate scraping modules for Windows operating system based PCs as well as Linux or OS X based computers, or mobile operating systems such as iOS and android, and as the type of users' devices and operating systems becomes varied, the scale and cost of equipment used for development exponentially increase.

SUMMARY

According to an aspect of the present disclosure, there is provided a system, method and computer program for data scraping, in which a script engine in which environment information of scraping is stored allows the processing of scraping from various operating systems in one scraping module, and generates a communication session conforming to a communication method of a scraping target institution and transmits an authentication value obtained by processing user information according to an authentication method of the target institution, thereby enabling operation in various platforms and collecting scraping information from various institutions without constraints by the operating system.

A data scraping system according to an embodiment includes a transmitting/receiving unit having a service program that calls inquiry or execution requiring scraping and configured to receive a scraping request including user information for scraping from a user device and transmit scraped data to the user device, and at least one data scraping information collection unit configured to scrape data from at least one institution using the user information received in the transmitting/receiving unit.

Each of the at least one data scraping information collection unit includes a scraping engine unit in platform independent script, the scraping engine unit configured to store identification information of the scraping target institution and environment information including authentication information and communication information corresponding to the scraping target institution, and scrape data from the institution based on the environment information.

In an embodiment, the scraping engine unit includes a scraping environment management unit configured to store the environment information, a session management unit configured to generate a communication session between the institution and the scraping engine unit based on the communication information, a communication management unit configured to process the user information based on the authentication information, and a script engine configured to transmit an authentication value obtained by processing the user information to the institution and scrape data from the institution.

In an embodiment, the user information includes a user's biometric authentication information.

In an embodiment, each of the at least one data scraping information collection unit further includes a meta database to designate a data item to be scraped. In this instance, the scraping engine unit is further configured to extract data to scrape based on the meta database from a data set provided by the institution.

In an embodiment, each of the at least one data scraping information collection unit further includes a task management unit to allocate the user information for scraping and a task based on the user information to the scraping engine unit using an internal scheduling algorithm.

In an embodiment, each of the at least one data scraping information collection unit further includes a platform management unit to monitor if the task management unit normally operates, when an error occurs, execute the task management unit again, and store, in the meta database, identification information for identifying a location in which the data item to be scraped is positioned in the data set.

In an embodiment, each of the at least one data scraping information collection unit further includes a verification unit configured to verify the scraping request by inspecting if the service program of the transmitting/receiving unit and the scraping engine unit are cross-authenticated.

In an embodiment, each of the at least one data scraping information collection unit further includes a certificate distribution unit configured to store one or multiple users' certificates that are cross-authenticated with the data scraping information collection unit, and install a necessary certificate in the scraping engine unit based on a scraping task allocated to the data scraping information collection unit.

In an embodiment, each of the at least one data scraping information collection unit further includes a module update unit configured to update a certificate installed in the scraping engine unit using a certificate received from the user device, when the certificate installed in the user device and the certificate installed in the scraping engine unit are different.

In an embodiment, each of the at least one data scraping information collection unit further includes a scraping error modification unit to, when an error occurs while the user device directly performs scraping, analyze an error log from scraping input information inputted in the user device at the time of error occurrence, and update a scraping module in the user device based on the analyzed error log.

A data scraping method according to an embodiment includes receiving, by a transmitting/receiving unit of a data scraping system having a service program that calls inquiry or execution requiring scraping, a scraping request including information of inquiry or execution called by a user and user information from a user device, allocating, by the data scraping system, the user information and a task based on the user information to a scraping engine unit of the data scraping system, wherein the scraping engine unit is in platform independent script and stores identification information of the scraping target institution and environment information including authentication information and communication information corresponding to the scraping target institution, scraping, by the scraping engine unit, data from the institution based on the environment information, and transmitting, by the transmitting/receiving unit, the scraped data to the user device.

In an embodiment, the scraping of data from the institution includes generating, by the scraping engine unit, a communication session between the institution and the scraping engine unit based on the communication information, processing, by the scraping engine unit, the user information based on the authentication information, and transmitting, by the scraping engine unit, an authentication value obtained by processing the user information to the institution and scraping data from the institution.

The data scraping method according to an embodiment further includes, before the scraping of data from the institution, storing, by the data scraping system, a data item to be scraped in a meta database. In this instance, the scraping of data from the institution includes extracting data to scrape based on the meta database from a data set provided by the institution.

The data scraping method according to an embodiment further includes, before the scraping of data from the institution, allocating, by a task management unit of the data scraping system, the user information and the task to the scraping engine unit using an internal scheduling algorithm.

The data scraping method according to an embodiment further includes monitoring, by the data scraping system, if the task management unit normally operates and when an error occurs, executing the task management unit again, and storing, by the data scraping system, identification information in the meta database, the identification information for identifying a location in which the data item to be scraped is positioned in the data set.

The data scraping method according to an embodiment further includes, before the scraping of data from the institution, verifying, by the data scraping system, the scraping request by inspecting if the service program of the transmitting/receiving unit and the scraping engine unit are cross-authenticated.

In an embodiment, the data scraping system stores one or multiple users' certificates that are authenticated with the data scraping system. In this instance, the data scraping method according to an embodiment further includes, before the scraping of data from the institution, installing, by the data scraping system, a necessary certificate in the scraping engine unit based on the scraping task allocated to the scraping engine unit.

The data scraping method according to an embodiment further includes, before the scraping of data from the institution, updating, by the data scraping system, a certificate installed in the scraping engine unit using a certificate received from the user device, when the certificate installed in the user device and the certificate installed in the scraping engine unit are different.

The data scraping method according to an embodiment further includes, when an error occurs while the user device directly performs scraping, analyzing, by the data scraping system, an error log from scraping input information inputted in the user device at the time of error occurrence, and updating, by the data scraping system, a scraping module in the user device based on the analyzed error log.

A computer program according to an embodiment may be stored in a computer-readable medium to perform the data scraping method according to the above-described embodiments in combination with hardware.

According to the system and method for data scraping in accordance with an aspect of the present disclosure, the script engine in which environment information of scraping is stored is mounted in the scraping module, allowing the processing of scraping from various operating systems in one scraping module without any need to separately develop scraping modules for each operating system, thereby significantly reducing costs and efforts incurred in developing scraping systems in keeping up with the current trend towards the diversity of devices and operating systems used.

According to the system and method for data scraping in accordance with an aspect of the present disclosure, the script engine generates a communication session with financial institution such as banks, stock brokerages and card companies, public organization, or any other institution that provides property information in conformity with a communication method required by the corresponding institution, and transmits an authentication value obtained by processing user information according to an authentication method of the target institution, in order to scrape desired data, for example, financial information such as account balances, account transaction details, card acceptance details, card statements, card limits, stock balances and insurance details, or public information such as National Tax Service proof of income, business registration certificate, closure or cessation of business information, proof of tax payment, proof of basis of assessment in value added taxes, proof of standard financial statement, certificate of qualification for National Health Insurance, certificate of losing a qualification for National Health Insurance, employer health insurance premium details per individual, national pension payment details, and Public Service24 ID card authenticity information.

DETAILED DESCRIPTION OF EMBODIMENTS

Hereinafter, embodiments of the present disclosure will be described in detail with reference to the accompanying drawings.

Figure 2:
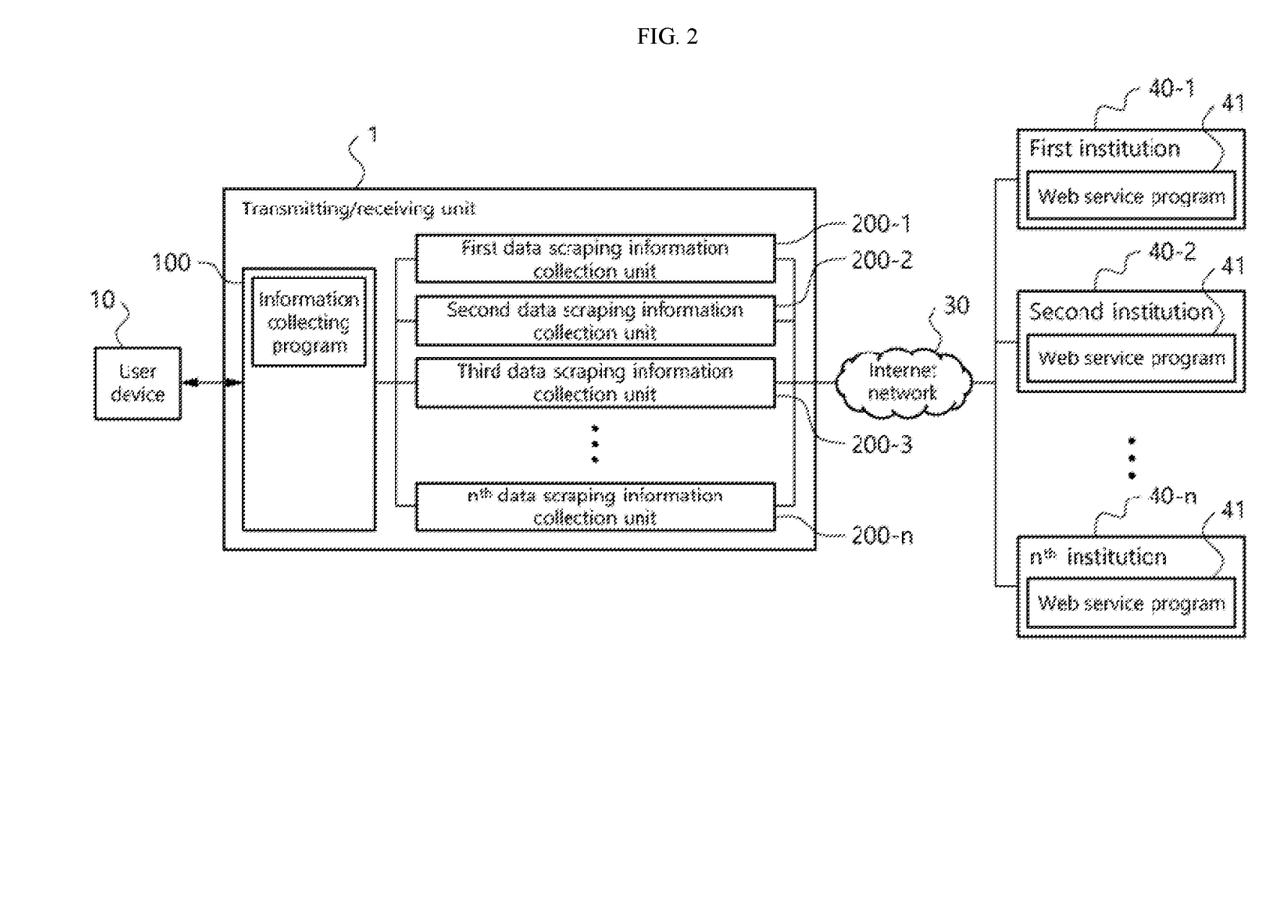
FIG. 2 is a block diagram showing the architecture of a data scraping system according to an embodiment.

FIG. 2 is a block diagram showing the architecture of a data scraping system according to an embodiment.

Referring to FIG. 2, the data scraping system 1 according to this embodiment includes a transmitting/receiving unit 100 and at least one data scraping information collection unit 200-1 to 200-$n$. The data scraping system 1 according to embodiments can have aspects that are wholly in hardware, or partly in hardware and partly in software. For example, the transmitting/receiving unit 100 and the data scraping information collection units 200-1 to 200-$n$ that form the data scraping system 1 and each unit included therein may refer collectively to as a device for transmitting and receiving data of a particular format and content by an electronic communication method, and its related software.

The term "unit", "module", "server", "system", "platform", "device" or "terminal" as used herein is intended to indicate a combination of hardware and software that runs by the corresponding hardware. For example, here, hardware may be a data processing device including a CPU or other processor. Additionally, software that runs by hardware may refer to a process in execution, an object, an executable, a thread of execution and a program.

The data scraping system 1 is configured to communicate with a user device 10 and receive user information necessary for call commands about inquiry or execution requiring scraping and authorization from the user device 10. The user device 10 may be a Windows Operating System (OS) based Personal Computer (PC), but is not limited thereto, and may include a Linux or OS X based computer, a mobile computing device such as a smartphone based on mobile OS such as iOS and android, a set-top box for notebook computers, personal digital assistants (PDAs), tablets and Internet Protocol Television (IPTV), or any other device.

Additionally, the data scraping system 1 is configured to access web service programs 41 registered in first to $n^{th}$ institutions 40-1 to 40-$n$ via an Internet network 30, and scrape data from the first to $n^{th}$ institutions 40-1 to 40-$n$. A communication method via the Internet network 30 may include all communication methods that enables networking between objects, and is not limited to wired communication, wireless communication, 3G, 4G, or other methods. For example, the Internet network 30 may refer to a communication network by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HS-DPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) and ultrasonic communication, but is not limited thereto.

As shown in FIG. 2, the data scraping system 1 according to this embodiment includes the transmitting/receiving unit 100 having an information collecting program that calls inquiry or execution requiring scraping, to receive a scraping request including user information for scraping and transmit the scraped data to the user device 10. Additionally, the data scraping system 1 according to this embodiment includes first to $n^{th}$ data scraping information collection units 200-1 to 200-$n$ that are connected to the Internet network 30 by accessing the Internet network 30 based on the scraping request transmitted from the transmitting/receiving unit 100 and scrape data from first to $n^{th}$ institutions 40-1 to 40-$n$ each having the web service program 41. That is, the first to $n^{th}$ data scraping information collection units 200-1 to 200-$n$ each may scrape data from the first to $n^{th}$ institutions 40-1 to 40-$n$.

The first to $n^{th}$ institutions 40-1 to 40-$n$ refer to a system that is run by an organization from which information is collected by the data scraping system 1 according to this embodiment, and may include financial institutions such as banks, stock brokerages and card companies, public organizations, or any other institution that provides property information, and are not limited to a particular organization. Additionally, the number of institutions from which information can be collected by the data scraping system 1 according to this embodiment is plural.

The information collecting program of the transmitting/receiving unit 100 is a program that is accessed and used by the user device 10 to call inquiry or execution requiring scraping and input user information for authentication. For example, the information collecting program may be a program for balance transaction details inquiry services to view bank account balances and/or transaction details and a program for money collecting services to enable transfers between accounts, but is not limited thereto. Additionally, the information collecting program may be designed for an account integration service that allows the user to see his/her accounts distributed over many institutions using one program.

Each of the first to $n^{th}$ data scraping information collection units 200-1 to 200-*n* includes a scraping engine unit in platform independent script as described below. The scraping engine unit stores identification information of a scraping target institution and environment information including authentication information and communication information corresponding to the scraping target institution, and scrape data from the first to $n^{th}$ institutions 40-1 to 40-*n* based on the environment information. Each of the first to $n^{th}$ data scraping information collection units 200-1 to 200-*n* may operate on a virtual machine, but is not limited thereto.

The user accesses the information collecting program by connecting to the data scraping system 1 using the user device 10, and the data scraping system 1 internally performs a scraping task by data processing in distributed manner to the first to $n^{th}$ data scraping information collection units 200-1 to 200-*n* according to the type of the target institution. However, the scraping information collection units 200-1 to 200-*n* may be only functional divisions of a scraping module implemented using one hardware device. For security, in intervals between the information collecting program and the data scraping information collection units 200-1 to 200-*n*, the program and the scraping module may be authenticated by system authentication of Public Key Infrastructure (PM), and the user information and the results may be communicated through the Secure Sockets Layer (SSL).

The user information for scraping is transmitted to the data scraping information collection units 200-1 to 200-*n* through the authentication and communication intervals between the information collecting program and the data scraping information collection units 200-1 to 200-*n*, and is processed by the data scraping information collection units 200-1 to 200-*n* in conformity with the communication security policy of each institution 40-1 to 40-*n*.

Specifically, the script engine of each of the data scraping information collection units 200-1 to 200-*n* scrapes data by forming a communication session with each institution 40-1 to 40-*n* in conformity with the communication policy of each institution 40-1 to 40-*n*, processing the user information in conformity with the security policy of each institution 40-1 to 40-*n*, and transmitting an authentication value corresponding to the processing results to each institution 40-1 to 40-*n*. For example, the scraped data may be financial information such as account balances, account transaction details, card acceptance details, card statements, card limits, stock balances and insurance details, or public information such as National Tax Service proof of income, business registration certificate, closure or cessation of business information, proof of tax payment, proof of basis of assessment in value added taxes, proof of standard financial statement, certificate of qualification for National Health Insurance, certificate of losing a qualification for National Health Insurance, employer health insurance premium details per individual, national pension payment details, and Public Service24 ID card authenticity information, but is not limited thereto. The scraping results may be collected by the information collecting program through the authentication and communication intervals with the data scraping information collection units 200-1 to 200-*n*.

Figure 3:
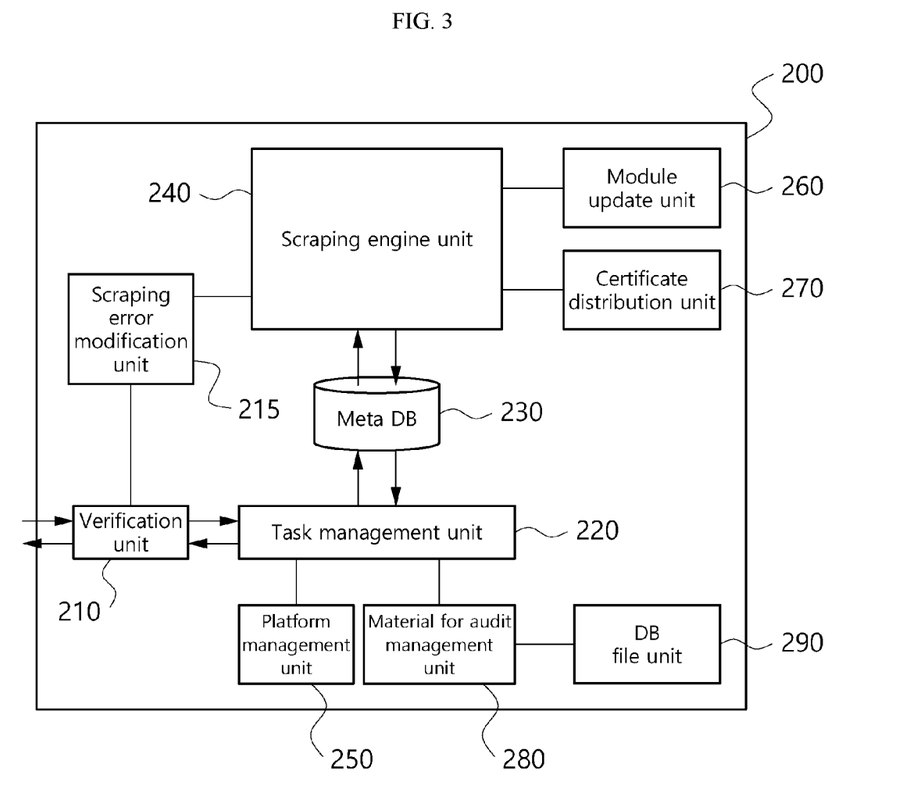
FIG. 3 is a block diagram showing a detailed configuration of a data scraping information collection unit of a data scraping system according to an embodiment.

FIG. 3 is a block diagram showing a detailed configuration of a data scraping information collection unit of the data scraping system according to an embodiment, and the data scraping information collection unit 200 shown in FIG. 3 corresponds to each of the first to $n^{th}$ data scraping information collection units 200-1 to 200-*n* shown in FIG. 2.

Referring to FIG. 3, the data scraping information collection unit 200 includes a scraping engine unit 240. The scraping engine unit 240 is implemented in script written in platform independent language such as JAVA script, and here, the platform includes hardware of a device in which the data scraping information collection unit 200 is implemented and an operating system (OS) for operating the hardware. By configuring the scraping engine unit 240 in platform independent script, scraping may be performed in any execution environment by the scraping engine unit 240 without a need to separately develop a scraping engine according to the type of device or OS.

In an embodiment, the data scraping information collection unit 200 further includes a meta database (DB) 230 to designate a data item to be scraped. In this instance, the scraping engine unit 240 is configured to extract data corresponding to an item to scrape based on the meta DB 230 from data sets provided by each of the first to $n^{th}$ institutions 40-1 to 40-*n*.

That is, the meta DB 230 serves to store information to collect the user desires, for example, a target for collection and a scraping item. For example, when the user desires to see account transfer details, a code or symbol indicating transfer details may be stored in the meta DB 230 as a data item to be scraped. In this instance, the scraping engine unit 240 collects scraping information based on the data item of the meta DB 230 to be scraped. To this end, the meta DB 230 includes identification information for extracting the data item from the data sets provided by each institution. For example, the identification information may be information for identifying a location in which a particular data item is positioned from a data set that may be received through the protocol such as Hypertext Transfer Protocol (HTTP) or Java Script Object Notation (JSON).

In this embodiment, the scraping engine unit 240 selectively scrapes data from the data set using the data item to be scraped, stored in the meta DB 230, instead of scraping all data on the screen as conventionally. The selectively collected scraping information may be identified through comparison with the scraping item of the meta DB 230, transmitted to the information collecting program of the transmitting/receiving unit 100 (FIG. 2), and provided to the user.

In an embodiment, the data scraping information collection unit 200 further includes a task management unit 220. The task management unit 220 allocates user information for scraping and a task based on the user information to the scraping engine unit 240 using an internal scheduling algorithm. For example, the user information and the task to be allocated may be transmitted to the data scraping information collection unit 200 in the form of scraping collection information text. For example, the task management unit 220 may transmit the user information for scraping transmitted through the internal scheduling algorithm to the scraping engine unit 240 using Application Program Interface (API) call or Object Linking and Embedding (OLE) protocol, and receive the results via socket or Secure Sockets Layer (SSL) communication.

In an embodiment, the data scraping information collection unit 200 further includes a platform management unit 250. The platform management unit 250 serves to update the task management unit 220 to the latest version, or when the task management unit 220 performs abnormal execution or a problem caused by an error occurs, the platform management unit 250 serves to stop all processes on the task management unit 220 and execute the task management unit 220 again.

Additionally, in the event of an exception that may occur upon operation when the task management unit 220 calls the scraping engine unit 240, the platform management unit 250 may serve to control a module update unit 260 to update the scraping engine unit 240 in response to a user input related to installation or update of a necessary program for the scraping task, for example, a security module.

Additionally, the platform management unit 250 may perform function to receive, from the user, input of identification information for identifying a location in which the data item to be scraped is positioned in the data set provided by the scraping target institution, and store the inputted identification information in the meta DB 230.

Further, the platform management unit 250 may serve to monitor power ON/OFF status of the data scraping information collection unit 200 and the script engine inside thereof, version information of OS installed in the virtual machine for implementing the data scraping information collection unit 200, whether or not the data scraping information collection unit 200 is currently waiting for the user's input, and hardware data for implementing the data scraping information collection unit 200 such as occupancy percentage, available capacity, usage status and network occupancy status of CPU, Main Memory, USB Host Controller, Hard Disk Drive and Network Interface Card. The platform management unit 250 may be in charge of a pre-processing task or file transmission/reception for updates and synchronization of programs, libraries or certificates of the transmitting/receiving unit 100 (FIG. 2) and the data scraping information collection unit 200.

In an embodiment, the data scraping information collection unit 200 further includes a verification unit 210. When the information collecting program of the transmitting/receiving unit 100 (FIG. 2) requests scraping, the verification unit 210 identifies if the information collecting program and the data scraping information collection unit 200 are cross-authenticated programs. As a result of identification, when the information collecting program and the data scraping information collection unit 200 are cross-authenticated programs, the verification unit 210 may transmit the scraping request to the task management unit 220 to enable scraping, and when they are not cross-authenticated programs, may reject the scraping request.

In an embodiment, the data scraping information collection unit 200 includes a certificate distribution unit 270. The certificate distribution unit 270 performs function to store one or multiple users' certificates that are cross-authenticated with the data scraping information collection unit 200, and install a necessary certificate in the scraping engine unit 240 according to the scraping task allocated to the data scraping information collection unit 200.

Additionally, in an embodiment, the data scraping information collection unit 200 further includes the module update unit 260. The module update unit 260 compares a certificate installed in the user device 10 (FIG. 2) and a certificate installed in the scraping engine unit 240 based on authentication information included in the scraping request, and when the certificate installed in the user device 10 and the certificate installed in the scraping engine unit 240 are different, the module update unit 260 may serve to update the certificate of the scraping engine unit 240 and the certificate of the certificate distribution unit 270 on the basis of the certificate installed in the user device 10.

In an embodiment, the data scraping information collection unit 200 further includes a material for audit management unit 280. The material for audit management unit 280 stores and manages service malfunction in using the data scraping information collection unit 200, the execution time, a brief description of the executed task, information for optimization, and authorization information of the scraping task.

In an embodiment, the data scraping information collection unit 200 further includes a DB file unit 290. The DB file unit 290 is controlled by the material for audit management unit 280, and serves to store logs of the verification unit 210, the task management unit 220, the platform management unit 250, the module update unit 260 and the certificate distribution unit 270 using API call or OLE protocol.

In an embodiment, the data scraping information collection unit 200 further includes a scraping error modification unit 215. In the client scraping operation involving scraping directly performed by the user device 10, to solve an error occurring in the scraping module on the user device 10, the scraping error modification unit 215 may perform an operation of updating the scraping module on the user device 10. That is, when an error occurs while the user device 10 directly performs scraping, the scraping error modification unit 215 analyzes an error log from scraping input information inputted in the user device 10 at the time of error occurrence, and updates the scraping module in the user device 10 based on the analyzed error log.

Conventionally, when an error occurs while the user device directly performs scraping, in general, the error is modified through a developer's remote access to the user terminal or by transmitting an error log to the server. However, in the case of remote access, the user has to install a separate program in the user terminal, and the user's personal information may be leaked while the error log is transmitted to the server, and in the case of many logs, may be lost. Additionally, because response information from the scraping target external institution is in different formats for each user, it is required to possess test accounts of various cases.

According to an embodiment of the present disclosure, to solve this problem, upon scraping, input information is encrypted, the scraping error modification unit 215 receives it, and tests through cloud scraping, thereby modifying the error quickly. In an embodiment, the above-described error modification operation may be performed on the user device 10 that communicates with the information collecting program authenticated by the verification unit 210.

Specifically, in the event that a scraping error occurs while the user device 10 performs scraping, the scraping error modification unit 215 may receive scraping input information inputted in the user device 10 when the error occurred, and modify the error by analyzing the error log. In this case, the received scraping input information may be in encrypted state.

For example, the scraping error modification unit 215 may determine that a scraping error occurred when a data part A1 previously analyzed by the scraping module and a data part A2 obtained by currently scraping corresponding to the pre-analyzed data part A1 are different. Here, the pre-analyzed data part used in determining if a scraping error occurred may include at least one of a unique value, tag information and parsed information that may identify the corresponding external institution server.

Additionally, when the scraping error modification unit 215 determines that a scraping error occurs, the scraping error modification unit 215 may generate an error log. Here, the error log may include at least one of a log time, a platform type, an app ID, library version information, a device ID and an error code.

Subsequently, the scraping error modification unit 215 may derive an error cause by comparing the error log with a data part including the pre-analyzed data part A1, and modify the data part A2 obtained by currently scraping based on the error cause. Further, the scraping error modification unit 215 may update the scraping module (not shown) in the user device 10 to modify the error cause. The updating of the scraping module in the user device 10 may be performed by receiving data input corresponding to updated scraping module from administrator and transmitting the same to the user device 10.

For example, the scraping error modification unit 215 may transmit a software update request in the user device 10 to the user device 10, and transmit data for scraping module update to the user device 10 in response to update request acceptance of the user device 10.

Here, the scraping input information may include various information related to finance such as a bank code, a class (personal banking or business banking), a requested service type (all accounts inquiry, transaction details inquiry, etc.), an account number, a card code, a login electronic signature value, a settlement date, a search start date or a search end date. In this instance, the scraping error modification unit 215 may receive a login electronic signature value obtained by processing the user's authentication information according to an authentication method required by the financial institution, and based on this, modify the error of the scraping module, thereby preventing a security risk caused by the transmission of original data of the user's authentication information to an external server. Additionally, the user's login electronic signature value is deleted from the scraping error modification unit 215 in response to the reception of update request acceptance of the user device 10, thereby preventing a potential security risk caused by the login electronic signature value remaining on the server after the update of the scraping module.

Figure 4:
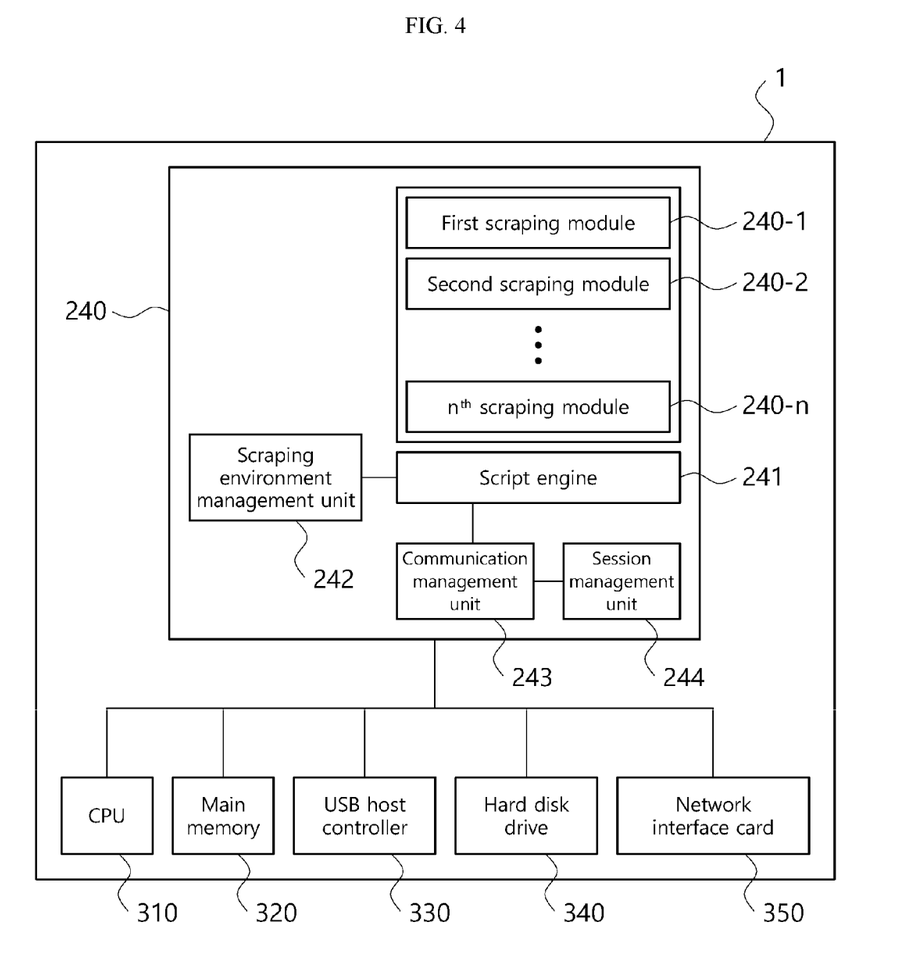
FIG. 4 is a block diagram showing a scraping engine unit shown in FIG. 3 and hardware data for implementing the same.

FIG. 4 is a block diagram showing the scraping engine unit shown in FIG. 3 and hardware data for implementing the same.

Referring to FIG. 4, the scraping engine unit 240 may include a script engine 241, a scraping environment management unit 242, a communication management unit 243 and a session management unit 244. In the embodiments, the entire scraping engine unit 240 is implemented in platform independent script, and the script engine 241, the scraping environment management unit 242, the communication management unit 243 and the session management unit 244 may be functional divisions of the script. Additionally, the scraping engine unit 240 may be implemented such that it is executed using hardware including a CPU 310, a main memory 320, a USB host controller 330, a hard disk drive 340 and a network interface card 350, and software including a device driver and a CMOS BIOS for each hardware component.

The scraping environment management unit 242 stores identification information of a scraping target institution and environment information including authentication information and communication information corresponding to the scraping target institution. In this embodiment, as the scraping environment management unit 242 in which the environment information is stored is implemented in the script of the scraping engine unit 240, an advantage is that there is no need to develop a scraping engine individually according to the type of the platform of the user device or its OS.

The session management unit 244 performs function to generate and maintain a communication session that establishes communication connection between the scraping engine unit 240 and the institution based on the communication information of the environment information. In this instance, the communication information may include information such as the type of communication encryption protocol or session maintenance time, required by the institution for security communication, and the session management unit 244 performs function to manage the communication session for the institution according to the communication encryption protocol and the session maintenance time requested from the institution corresponding to the scraping request.

The script engine 241 is configured to scrape data from the institution by transmitting, to the institution, an authentication value obtained by processing the user information based on the authentication information of the institution stored in the scraping environment management unit 242. For example, to scrape data corresponding to the called inquiry or execution, the authentication information may be information associated with an authentication method required for each of the first to $n^{th}$ institutions 40-1 to 40-$n$ (FIG. 2), and for data scraping, the script engine 241 is configured to transmit an authentication value obtained by processing the user information by a corresponding authentication method (for example, asymmetric encryption) to the first to $n^{th}$ institutions 40-1 to 40-$n$ (FIG. 2), and receive data from the first to $n^{th}$ institutions 40-1 to 40-$n$ (FIG. 2).

For user authentication required for scraping, the communication management unit 243 processes the user information according to the communication security policy required by each institution, and transmits an authentication value corresponding to the processing results to the script engine 241. To this end, the scraping environment management unit 242 stores information associated with the authentication method for each institution, and the communication management unit 243 processes the user information according to an authentication method corresponding to a current scraping target institution among information stored in the scraping environment management unit 242, and transmits the authentication value to the script engine 241. The processing of the user information may refer to a process of encrypting certificate information and an electronic signature according to the security policy required by the institution.

Additionally, in an embodiment, the authentication information is differently defined for each data item even in the same institution. In this instance, the communication management unit 243 may process the user information in conformity with a communication security policy of an institution from which data is to be scraped and a communication security policy defined for a data item to scrape in the institution, and transmit the processed authentication value to the script engine 241.

The script engine 241 transmits the authentication value to the institution through the communication session generated as described above, and receives a data set from the institution by a scraping method. In an embodiment, the scraping engine unit 240 corresponds to a scraping module configured using the script engine 241 and the hardware data 310, 320, 330, 340, 350, and a plurality of scraping modules may be configured to perform multiple scraping through first to $n^{th}$ scraping modules 240-1 to 240-n.

In an embodiment, the script engine 241 may receive information associated with a change in communication method and/or authentication method required by the target institution during scraping by a scraping method. For example, the communication encryption method or authentication method of user information required by the financial institution may be changed at any time, and in this case, a scraping attempt using a communication method or authentication method before change fails. When a scraping attempt using a communication method and authentication method currently stored in the scraping environment management unit 242 fails, the script engine 241 accesses another server address that provides information associated with a communication method and/or authentication method required by the institution, rather than an existing institution server address (for example, a web page) for receiving a data set, and receives the information associated with the communication method and/or authentication method required by the corresponding institution by a scraping method.

That is, the script engine 241 attempts to scrape user information from an institution web page based on environment information currently possessed, and when scraping fails due to an error in communication method or authentication method, the script engine 241 may scrape information for verifying the environment information through a separate web page that defines a communication method and an authentication method of the institution. In this instance, the separate web page may correspond to another address provided by the server of the scraping target institution, or a separate server provided by a third institution, not the scraping target institution.

When the change in environment information is identified by the above-described process, the scraping environment management unit 242 updates the environment information stored in the scraping environment management unit 242 based on the communication method and/or the authentication method scraped through the script engine 241. Subsequently, the session management unit 244 generates a communication session for scraping based on the communication information of the updated environment information. Additionally, the communication management unit 243 transmits an authentication value obtained by processing the user information to the script engine 241 based on the authentication information of the updated environment information.

Meanwhile, the session management unit 244 and the communication management unit 243 may download necessary information from an external policy server (not shown) to enable an operation according to the updated environment information. For example, the session management unit 244 and the communication management unit 243 may download, from the policy server, a communication encryption policy, a data encryption policy and a certificate required to form a session or process the user information according to the updated environment information. However, this is for illustration only, and in other embodiment, algorithms and library files for processing by various communication methods and authentication methods may be pre-stored in the session management unit 244 and the communication management unit 243, and the session management unit 244 and the communication management unit 243 may select and use appropriate information based on the environment information of the scraping environment management unit 242.

Figure 5:
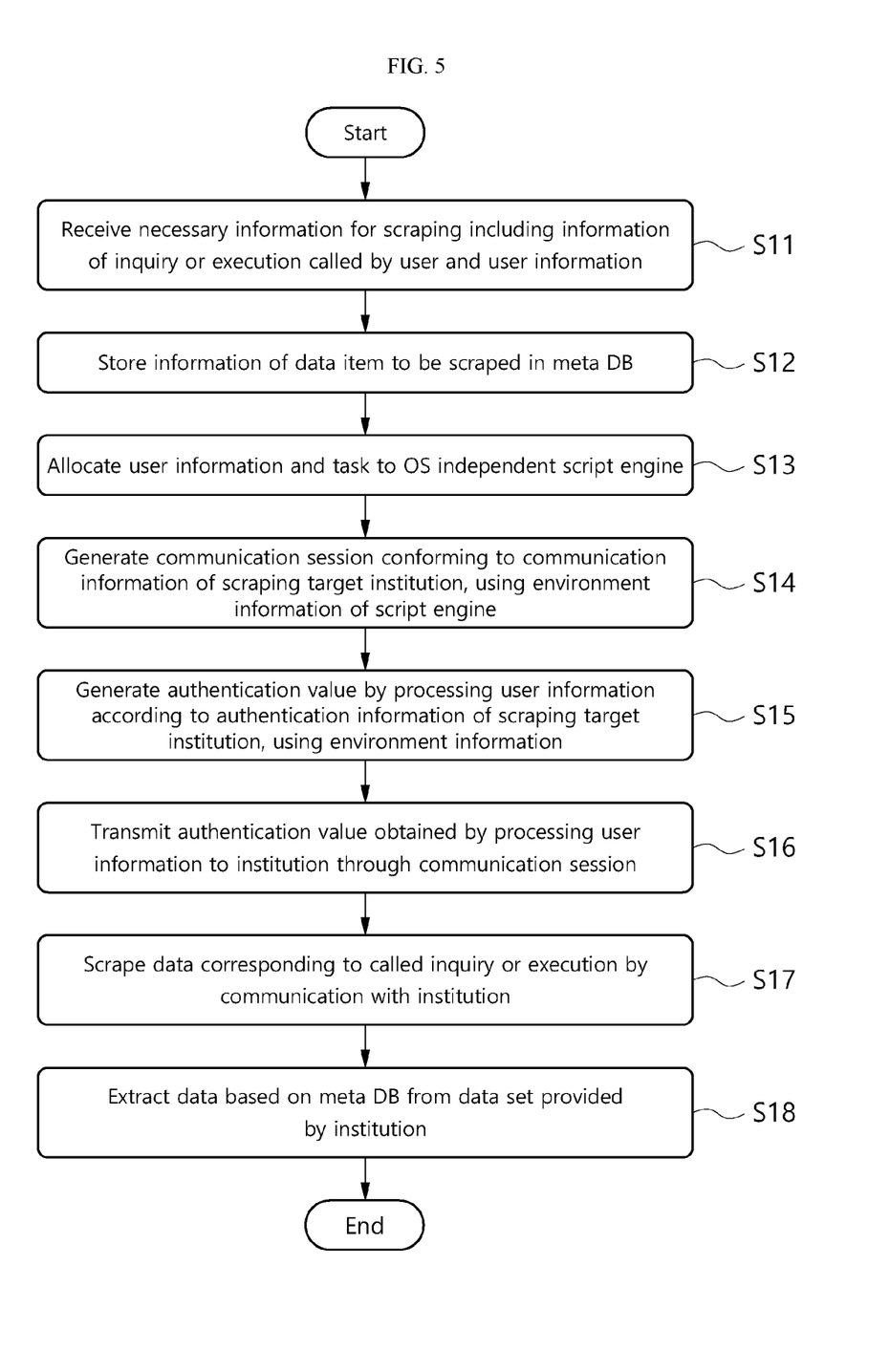
FIG. 5 is a flowchart showing each step of a data scraping method according to an embodiment.

FIG. 5 is a flowchart showing each step of a data scraping method according to an embodiment. The data scraping method according to this embodiment may be performed using the data scraping system according to the embodiments of the present disclosure.

Referring to FIG. 5, first, necessary information for scraping including information of inquiry or execution called by the user and user information may be received (S11). In an embodiment, information of a data item to be scraped may be stored in the meta DB (S12). Subsequently, user information and a task may be allocated to the platform independent script engine using an internal scheduling algorithm (S13). For example, the user information and the task to be allocated may be transmitted to the script engine in the form of scraping collection information text.

The script engine to which the user information and the task are allocated generates a communication session conforming to the communication policy (for example, a communication encryption protocol, a session maintenance time) of a scraping target institution based on environment information stored in the script engine (S14). Additionally, the script engine generates an authentication value by processing the user information according to the security policy of the scraping target institution based on the environment information stored in the script engine (S15), transmits the generated authentication value to the communication session (S16), and scrapes data corresponding to inquiry or execution called by the user (S17). The authentication value may be a value obtained by encrypting a certificate and an electronic signature according to the security policy of the institution from which information is to be scraped, or may be simply user information such as the user's ID and password.

In an embodiment, the script engine extracts data from a data set provided by the institution based on a scraping item of the meta DB (S18). To this end, identification information defining a location of each item positioned in the data set provided by the institution may be pre-stored in the meta DB. The scraping data extracted by the above-described process may be collected by the information collecting program and provided to the user.

Figure 6:
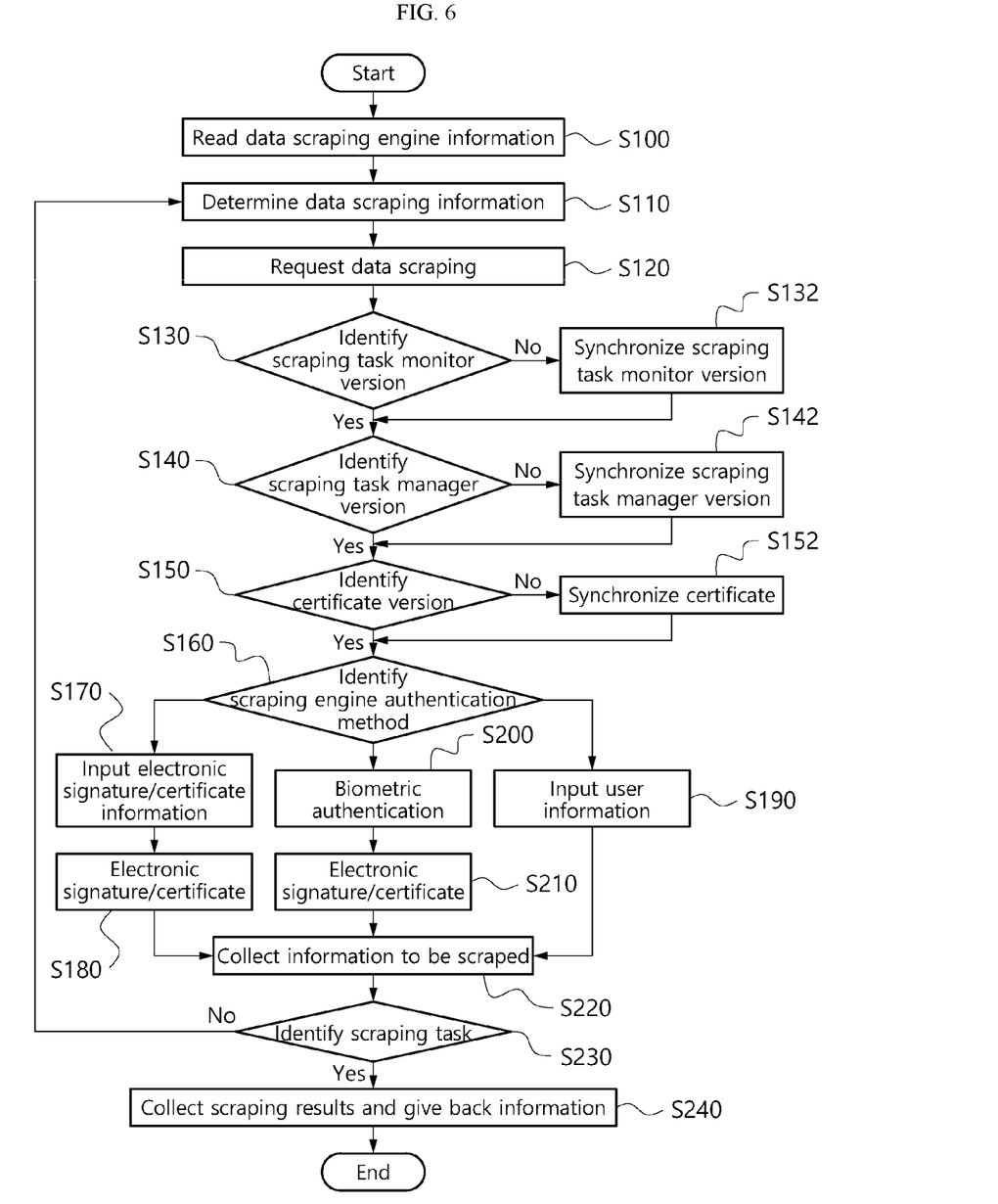
FIG. 6 is a flowchart showing each step of a data scraping method according to another embodiment.

FIG. 6 is a flowchart showing each step of a data scraping method according to another embodiment.

Referring to FIGS. 3 and 6, first, the data scraping information collection unit 200 receives a scraping request from the user device 10 through the transmitting/receiving unit 100, and reads scraping engine information (S100). This may include a process of identifying a version of a certificate stored in the scraping engine unit, whether the scraping engine unit malfunctions or not, the execution time, a brief description of the executed task, information for optimization, and authorization information of the scraping task.

In an embodiment, the data scraping information collection unit 200 may determine an item to scrape based on the scraping request, and store it in the meta DB 230 (S110). When the item to scrape is determined, the data scraping information collection unit 200 requests scraping to the institution based on this (S120).

In a detailed process for scraping, first, the data scraping information collection unit 200 determines if a scraping task monitor version and a scraping task manager version for task management of the scraping engine unit 240 are identified, and when the versions are identified ('YES' in S130, S140), the process moves to the next step, and when the versions are not identified ('NO' in S130, S140), the data scraping information collection unit 200 synchronizes the scraping task monitor version and the scraping task manager version (S132, S142).

Subsequently, when the data scraping information collection unit 200 determines if a certificate version in the scraping engine unit 240 is identified, and when the version is identified ('YES' in S150), the process moves to the next step (S160), and when the version is not identified ('NO' in S150), the data scraping information collection unit 200 synchronizes the version of the certificate (S152), and then the process moves to the next step (S160).

In the above step S160, for the requested data scraping, an authentication method of the scraping engine required according to the security policy of the institution is identified (S160). The authentication method may be different for each institution, and even in one institution, the authentication method may be different depending on the data item to scrape. For example, for balance and deposit and withdrawal details inquiry, no certificate is required, and a data set may be provided from the institution only through the user ID and password input, whereas for transaction details or expiration date inquiry, certificate authentication through electronic signature may be needed.

According to the authentication method identified in the above step S160, when certificate authentication is necessary, the data scraping information collection unit 200 may receive input of a certificate and an electronic signature as user information (S170), process it according to the security policy required by the institution (S180), or receive input of an ID and a password as user information (S190), or receive the user's iris recognition information, footprint recognition information or another type of information related to human body as user information by a biometric authentication method (S200), and process it according to the security policy required by the institution (S210).

The data scraping information collection unit 200 transmits an authentication value obtained by processing the authentication information and collects information to be scraped from the institution (S220). In this instance, in an embodiment, the data scraping information collection unit 200 identifies if the scraped data matches the scraping item of the meta DB 230 by referring to the meta DB 230 (S230), and when unmatched, the data scraping information collection unit 200 reverts to S110 to perform scraping again, and when matched, the data scraping information collection unit 200 collects the scraping results and gives back the collected information to the user (S240).

According to the data scraping method in accordance with the embodiments described hereinabove, the scraping engine may be implemented in platform independent script to avoid the influence by the platform such as hardware of a device in which the data scraping information collection unit is implemented or OS for operating the corresponding device. The scraping engine may scrape desired data by generating a communication session conforming to a communication method of an institution such as a financial institution in the script, and transmitting, to the institution, an authentication value obtained by processing user information according to an authentication method required by financial institution. As a result, there is an advantage in allowing the processing of scraping from various operating systems in one scraping module without any need to separately develop scraping modules for each operating system, thereby significantly reducing costs and efforts incurred in developing scraping systems in keeping up with the current trend towards the diversity of devices and operating systems used.

The data scraping method according to the embodiments as described hereinabove may be at least partially implemented as a computer program and recorded in computer-readable recording media. The program for implementing the data scraping method is recorded in the recording media according to the embodiments, and the recording media includes any type of recording device in which computer-readable data can be stored. For example, the computer-readable recording media includes ROM, RAM, CD-ROM, magnetic tape, floppy disk, and optical data storing devices. Additionally, the computer-readable recording media is distributed over computer systems connected via a network so that computer-readable codes may be stored and executed in distributed manner. Additionally, functional programs, codes and code segments for realizing this embodiment will be easily understood by those having ordinary skill in the technical field to which this embodiment belongs.

Figure 7:
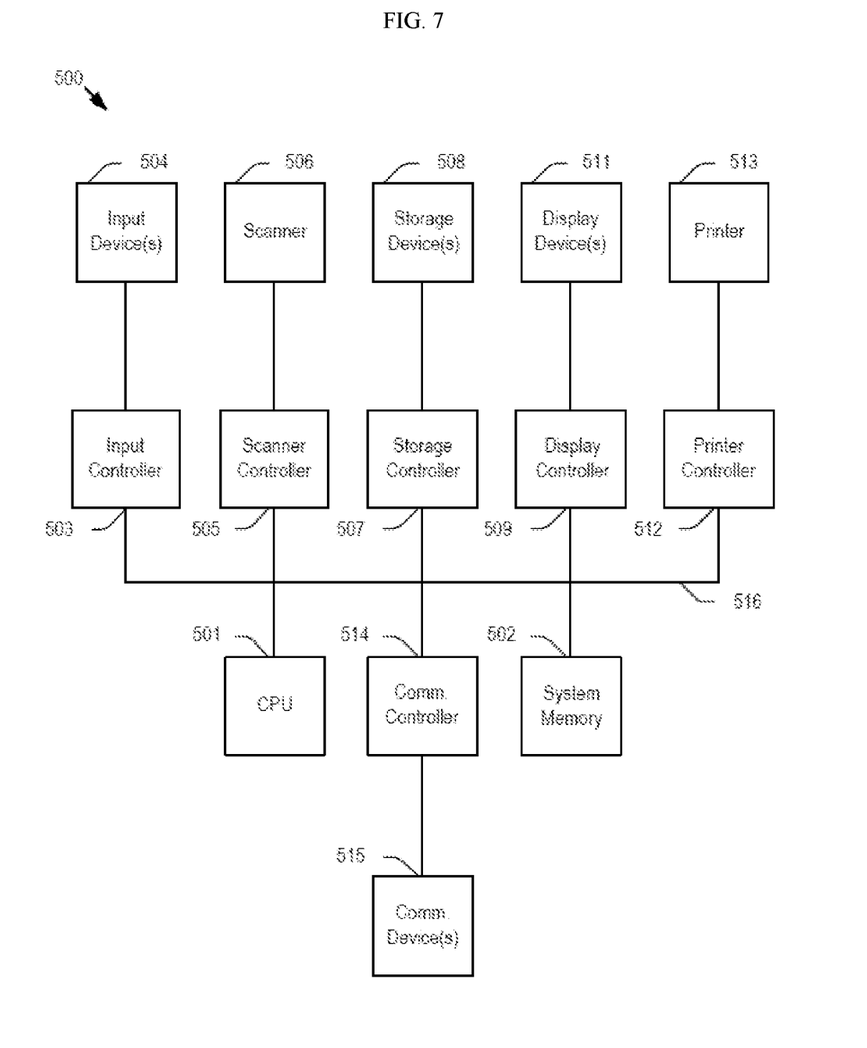
FIG. 7 is a block diagram showing the hardware architecture of a data scraping system according to an embodiment.

FIG. 7 is a block diagram showing the hardware architecture of a data scraping system according to an embodiment.

It will be understood that the functionalities shown for system 500 may operate to support various embodiments of a data scraping system although it shall be understood that a data scraping system may be differently configured and include different components. As illustrated in FIG. 7, the system 500 includes a central processing unit (CPU) 501 that provides computing resources and controls the computer. CPU 501 may be implemented with a microprocessor or the like, and may also include a graphics processor and/or a floating point coprocessor for mathematical computations. The system 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. The system 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. The system 500 may also include a display controller 509 for providing an interface to a display device 511, which may be a cathode ray tube (CRT), a thin film transistor (TFT) display, or other type of display. The system 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

The data scraping system according to embodiments achieve a technical improvement by configuring the scraping module to operate in any type of computer environment using a script engine. In existing systems, scraping modules had to be developed separately for each combination of various hardware and/or operating systems because a single scraping module that could be executed in various hardware and/or operating system did not exist. In other words, existing scraping modules are dependent on the hardware and operating system for running the scraping modules. The system according to embodiments of the present invention solves this technical problem of existing systems by implementing a single scraping module that may operate in various systems, e.g., as a platform independent script. The scraping module as a platform independent script can be interpreted into machine-executable commands by interpreter programs at the platform, and thus, the scraping module does not need to be written in a platform-dependent language from the development stage. As a result, these technical improvements to internet scraping technology significantly reduces costs and efforts incurred in developing scraping systems, which is particularly important in view of the current trend towards the diversity of devices and operating systems used.

Further, the data scraping system according to embodiments achieves further technical improvements by allowing the script engine to generate a communication session with external institutions that provide information in conformity with a communication method required by the corresponding institution. The system, according to some embodiments, transmits an authentication value obtained by processing user information according to an authentication method of the target institution. While the authentication method can be different for each institution and/or data item to be scraped, the data scraping system according to embodiments stores the authentication method in a platform-independent script. Since executing the script itself involves processing user information into an authenticated data suitable for the target institution and data item to be scraped, using the environment information in the script, the data scraping system achieves a new functionality of automatic authentication in accordance with the objective of internet scraping regardless of the target institution and data item to be scraped.

Furthermore, in the data scraping system according to some embodiments, the communication method and/or authentication method required by the institution can also be received by a scraping method. The scraped communication method and/or authentication method can be used to update the environment information in the platform-independent script, thereby eliminating the need for human management of the scraping module even when the communication method and/or authentication method used by target institutions are changed.

The present disclosure has been hereinabove described with reference to the embodiments shown in the accompanying drawings, but this is for illustration only and those having ordinary skill in the art will appreciate that various modifications may be made to the embodiments. However, it should be noted that such modifications fall in the scope of technical protection of the present disclosure. Therefore, the true scope of technical protection of the present disclosure should be defined by the technical spirit of the appended claims.

What is claimed is:

1. A data scraping system, comprising:
a transmitting/receiving unit having a service program that calls inquiry or execution requiring scraping, and configured to receive a scraping request including user information for scraping from a user device and transmit scraped data to the user device; and
at least one data scraping information collection unit configured to scrape data from at least one institution using the user information received in the transmitting/receiving unit,
wherein each of the at least one data scraping information collection unit comprises a scraping engine unit in platform independent script, the scraping engine unit configured to store identification information of the scraping target institution and environment information including authentication information and communication information corresponding to the scraping target institution, and scrape data from the institution based on the environment information,
wherein the communication information comprises at least one of a type of communication encryption protocol or session maintenance time,
wherein the scraping engine unit comprises: a scraping environment management unit configured to store the environment information; a session management unit configured to generate a communication session between the institution and the scraping engine unit based on the communication information; a communication management unit configured to process the user information based on the authentication information; and a script engine configured to transmit an authentication value obtained by processing the user information to the institution, and scrape data from the institution,
wherein each of the at least one data scraping information collection unit further comprises a meta database to designate a data item to be scraped, and the scraping engine unit is further configured to extract data to scrape based on the meta database from a data set provided by the institution,
wherein each of the at least one data scraping information collection unit further comprises a task management unit to allocate the user information for scraping and a task based on the user information to the scraping engine unit using an internal scheduling algorithm, and
wherein each of the at least one data scraping information collection unit further comprises a platform management unit to monitor if the task management unit normally operates, when an error occurs, execute the task management unit again, and store, in the meta database, identification information for identifying a location in which the data item to be scraped is positioned in the data set.

2. The data scraping system according to claim 1, wherein the user information includes a user's biometric authentication information.

3. The data scraping system according to claim 1, wherein each of the at least one data scraping information collection unit further comprises a verification unit configured to verify the scraping request by inspecting if the service program of the transmitting/receiving unit and the scraping engine unit are cross-authenticated.

4. The data scraping system according to claim 1, wherein each of the at least one data scraping information collection unit further comprises a certificate distribution unit configured to store one or multiple users' certificates that are cross-authenticated with the data scraping information collection unit, and install a necessary certificate in the scraping engine unit based on a scraping task allocated to the data scraping information collection unit.

5. The data scraping system according to claim 1, wherein each of the at least one data scraping information collection unit further comprises a scraping error modification unit to, when an error occurs while the user device directly performs scraping, analyze an error log from scraping input information inputted in the user device at the time of error occurrence, and update a scraping module in the user device based on the analyzed error log.

6. A data scraping system, comprising:
a transmitting/receiving unit having a service program that calls inquiry or execution requiring scraping, and configured to receive a scraping request including user information for scraping from a user device and transmit scraped data to the user device; and
at least one data scraping information collection unit configured to scrape data from at least one institution using the user information received in the transmitting/receiving unit,
wherein each of the at least one data scraping information collection unit comprises a scraping engine unit in platform independent script, the scraping engine unit configured to store identification information of the scraping target institution and environment information including authentication information and communication information corresponding to the scraping target institution, and scrape data from the institution based on the environment information, wherein each of the at least one data scraping information collection unit further comprises a certificate distribution unit configured to store one or multiple users' certificates that are cross-authenticated with the data scraping information collection unit, and install a necessary certificate in the scraping engine unit based on a scraping task allocated to the data scraping information collection unit, and a module update unit configured to update a certificate installed in the scraping engine unit using a certificate received from the user device, when the certificate installed in the user device and the certificate installed in the scraping engine unit are different.

7. A data scraping method, comprising:
receiving, by a transmitting/receiving unit of a data scraping system having a service program that calls inquiry or execution requiring scraping, a scraping request including information of inquiry or execution called by a user and user information from a user device;
allocating, by the data scraping system, the user information and a task based on the user information to a scraping engine unit of the data scraping system, wherein the scraping engine unit is in platform independent script and stores identification information of the scraping target institution and environment information including authentication information and communication information corresponding to the scraping target institution;
storing, by the data scraping system, a data item to be scraped in a meta database, wherein the scraping of data from the institution comprises extracting data to scrape based on the meta database from a data set provided by the institution;
allocating, by a task management unit of the data scraping system, the user information and the task to the scraping engine unit using an internal scheduling algorithm;
scraping, by the scraping engine unit, data from the institution based on the environment information; and
transmitting, by the transmitting/receiving unit, the scraped data to the user device;
monitoring, by the data scraping system, if the task management unit normally operates, and when an error occurs, executing the task management unit again; and
storing, by the data scraping system, identification information in the meta database, the identification information for identifying a location in which the data item to be scraped is positioned in the data set,
wherein the communication information comprises at least one of a type of communication encryption protocol or session maintenance time,
wherein the scraping of data from the institution comprises: generating, by the scraping engine unit, a communication session between the institution and the scraping engine unit based on the communication information; processing, by the scraping engine unit, the user information based on the authentication information; and transmitting, by the scraping engine unit, an authentication value obtained by processing the user information to the institution, and scraping data from the institution.

8. The data scraping method according to claim 7, wherein the user information includes the user's biometric authentication information.

9. The data scraping method according to claim 7, before the scraping of data from the institution, further comprising:
verifying, by the data scraping system, the scraping request by inspecting if the service program of the transmitting/receiving unit and the scraping engine unit are cross-authenticated.

10. The data scraping method according to claim 7, wherein the data scraping system stores one or multiple users' certificates that are authenticated with the data scraping system, and
the data scraping method further comprises:
before the scraping of data from the institution,
installing, by the data scraping system, a necessary certificate in the scraping engine unit based on the scraping task allocated to the scraping engine unit.

11. The data scraping method according to claim 10, further comprising:
when an error occurs while the user device directly performs scraping,
analyzing, by the data scraping system, an error log from scraping input information inputted in the user device at the time of error occurrence; and
updating, by the data scraping system, a scraping module in the user device based on the analyzed error log.

12. A computer program stored in a medium to perform the data scraping method according to claim 7 in combination with hardware.

13. A data scraping method, comprising:

receiving, by a transmitting/receiving unit of a data scraping system having a service program that calls inquiry or execution requiring scraping, a scraping request including information of inquiry or execution called by a user and user information from a user device;

allocating, by the data scraping system, the user information and a task based on the user information to a scraping engine unit of the data scraping system, wherein the scraping engine unit is in platform independent script and stores identification information of the scraping target institution and environment information including authentication information and communication information corresponding to the scraping target institution;

installing, by the data scraping system, a necessary certificate in the scraping engine unit based on the scraping task allocated to the scraping engine unit, wherein the data scraping system stores one or multiple users' certificates that are authenticated with the data scraping system;

updating, by the data scraping system, a certificate installed in the scraping engine unit using a certificate received from the user device, when the certificate installed in the user device and the certificate installed in the scraping engine unit are different;

scraping, by the scraping engine unit, data from the institution based on the environment information; and transmitting, by the transmitting/receiving unit, the scraped data to the user device, wherein the communication information comprises at least one of a type of communication encryption protocol or session maintenance time.

* * * * *

UNITED STATES PATENT AND TRADEMARK OFFICE
CERTIFICATE OF CORRECTION

PATENT NO. : 10,635,488 B2
APPLICATION NO. : 16/112528
DATED : April 28, 2020
INVENTOR(S) : Jae Won Jeong et al.

Page 1 of 1

It is certified that error appears in the above-identified patent and that said Letters Patent is hereby corrected as shown below:

On the Title Page

Item (72), Column 1, under Inventors, the nationality of Inventor Jae Won Jeong is incorrect.
Please amend to read "Jae Won Jeong, Gyeonggi-do (KR)".

Signed and Sealed this
Seventh Day of July, 2020

Andrei Iancu
*Director of the United States Patent and Trademark Office*